United States Patent
Kurizoe et al.

(10) Patent No.: US 11,898,343 B2
(45) Date of Patent: Feb. 13, 2024

(54) WATER-REPELLENT MEMBER, AND BUILDING MEMBER AND WET ROOM MEMBER USING SAME

(71) Applicant: Panasonic Intellectual Property Management Co., Ltd., Osaka (JP)

(72) Inventors: Naoki Kurizoe, Osaka (JP); Natsuki Sato, Osaka (JP); Tatsuya Okuno, Osaka (JP); Ryosuke Sawa, Osaka (JP); Tatsuro Yoshioka, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 372 days.

(21) Appl. No.: 17/440,989

(22) PCT Filed: Feb. 4, 2020

(86) PCT No.: PCT/JP2020/004118
§ 371 (c)(1),
(2) Date: Sep. 20, 2021

(87) PCT Pub. No.: WO2020/195184
PCT Pub. Date: Oct. 1, 2020

(65) Prior Publication Data
US 2022/0162850 A1    May 26, 2022

(30) Foreign Application Priority Data

Mar. 26, 2019  (JP) ................ 2019-059184
Aug. 23, 2019  (JP) ................ 2019-152540

(51) Int. Cl.
*E04B 1/62* (2006.01)
*C09K 3/18* (2006.01)
*C04B 38/00* (2006.01)

(52) U.S. Cl.
CPC .......... *E04B 1/62* (2013.01); *C09K 3/18* (2013.01); *C04B 38/00* (2013.01)

(58) Field of Classification Search
None
See application file for complete search history.

(56) References Cited

U.S. PATENT DOCUMENTS

| | | | |
|---|---|---|---|
| 2009/0274915 A1 | 11/2009 | Kirkpatrick et al. | |
| 2020/0172706 A1 | 6/2020 | Hindelang et al. | |

FOREIGN PATENT DOCUMENTS

| | | | |
|---|---|---|---|
| CN | 102015571 A | 4/2011 | |
| EP | 0903389 A1 | 3/1999 | |
| JP | 2001-88247 A | 4/2001 | |
| JP | 2003-334413 A | 11/2003 | |
| JP | 2005-179441 A | 7/2005 | |
| JP | 2007-201363 A | 8/2007 | |
| WO | 97/45502 A | 12/1997 | |
| WO | 2008/120505 A1 | 10/2008 | |
| WO | 2013/190184 A1 | 12/2013 | |
| WO | 2018/153495 A1 | 8/2018 | |

OTHER PUBLICATIONS

Kondo, WO-2008120505-A1, Oct. 2008 (machine translation) (Year: 2008).*
International Search Report for corresponding Application No. PCT/JP2020/004118, dated Apr. 7, 2020.
Written Opinion for corresponding Application No. PCT/JP2020/004118, dated Apr. 7, 2020.
Search Report for corresponding CN Application No. 202080022534.8, dated May 16, 2022.
Extended European Search Report for corresponding EP Application No. 20776719.5, dated Apr. 26, 2022.

* cited by examiner

*Primary Examiner* — Cheng Yuan Huang
(74) *Attorney, Agent, or Firm* — Renner, Otto, Boisselle & Sklar, LLP

(57) ABSTRACT

A water-repellent member includes a matrix part including an inorganic substance including at least one of a metal oxide or a metal hydroxide, and a water-repellent resin present in a dispersed state inside the matrix part. The water-repellent member has a porosity of 20% or less in a section of the matrix part. A building member and a wet room member each include the water-repellent member.

11 Claims, 9 Drawing Sheets (a)                    (b)

BACK-SCATTERED ELECTRON IMAGE (POSITION 1)

BINARIZED DATA (POSITION 1)

BACK-SCATTERED ELECTRON IMAGE (POSITION 2)

BINARIZED DATA (POSITION 2)

BACK-SCATTERED ELECTRON IMAGE (POSITION 3)

BINARIZED DATA (POSITION 3)

EXAMPLE 2-1

CF(m/z=31)

Zn(m/z=64)

EXAMPLE 2-2

CF(m/z=31)

Zn(m/z=64)

EXAMPLE 2-4

CF(m/z=31)　　　　　　　　Zn(m/z=64)

COMPARATIVE EXAMPLE 2-1

CF(m/z=31)　　　　　　　　Zn(m/z=64)

US 11,898,343 B2

WATER-REPELLENT MEMBER, AND BUILDING MEMBER AND WET ROOM MEMBER USING SAME

TECHNICAL FIELD

The present invention relates to a water-repellent member, and a building member and a wet room member each using the water-repellent member.

BACKGROUND ART

There has been an increasing demand for imparting water repellency to building members, such as exterior walls, and wet room members related to, such as kitchens, bathrooms, and toilets, thereby making it difficult for fur and other dirt to adhere to the surface, or making it easy to remove them when they adhere. Thus, studies for imparting water repellency to these members have been actively conducted.

Patent Literature 1 discloses an antifouling member including a substrate, and a surface layer provided on the substrate and containing a photocatalytic oxide, a silicone resin or silica, and a water-repellent fluororesin. The water-repellent resin and the photocatalytic oxide are microscopically dispersed and exposed on the outermost surface of the surface layer, and the photocatalytic oxide itself becomes hydrophilic by photocatalytic action. It is described that on this surface, a hydrophilic adherend easy to fit into a hydrophilic part does not fit into an adjacent hydrophobic part, and a hydrophobic adherend easy to fit into the hydrophobic part does not fit into the adjacent hydrophilic part, so that both the hydrophilic adherend and hydrophobic adherend are difficult to adhere to the surface of the member.

CITATION LIST

Patent Literature

Patent Literature 1: Japanese Unexamined Patent Application Publication No. 2001-88247

SUMMARY OF INVENTION

The antifouling member in Patent Literature 1 has the surface layer formed by a sol-gel method. Specifically, the surface layer is formed by applying a coating liquid made by mixing a photocatalytic oxide, a silica sol, an alkoxysilane, a water-repellent resin, and a solvent to the surface of the substrate, and then performing heat treatment. The surface layer obtained thus has a large number of pores due to volatilization of the solvent, and thus the water-repellent resin comes into contact with the atmosphere by long-term use, resulting in oxidative deterioration. Further, there is a difference in the thermal expansion coefficient between the substrate and the surface layer, and thus the surface layer is peeled off from the substrate by long-term use. Further, the sol-gel method only obtains a thin surface layer, and the surface layer is peeled off by a physical force, such as friction or aging deterioration.

The present invention has been made in consideration of such issues as described above, which are inherent in related art. An object of the present invention is to provide a water-repellent member that is stable for a long time when a water-repellent resin is used, and a building member and a wet room member each using the water-repellent member.

To solve the above-described issues, a water-repellent member according to a first aspect of the present invention includes a matrix part including an inorganic substance including at least one of a metal oxide or a metal hydroxide, and a water-repellent resin present in a dispersed state inside the matrix part, wherein the water-repellent member has a porosity of 20% or less in a section of the matrix part.

A building member according to a second aspect of the present invention includes the above-described water-repellent member.

A wet room member according to a third aspect of the present invention includes the above-described water-repellent member.

DESCRIPTION OF EMBODIMENTS

Figure 1:
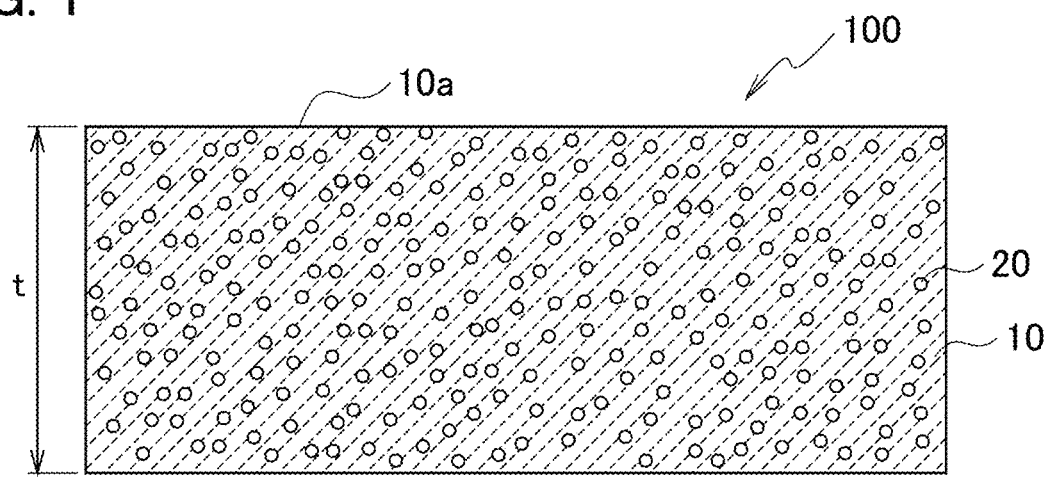
FIG. 1 is a schematic sectional view of an example of a water-repellent member according to a present embodiment.

A detailed description is given below of a water-repellent member according to the present embodiment, and a building member and a wet room member each using the water-repellent member. Note that dimensional ratios in the drawings are exaggerated for convenience of explanation and are sometimes different from actual ratios.

[Water-Repellent Member]

Figure 2:
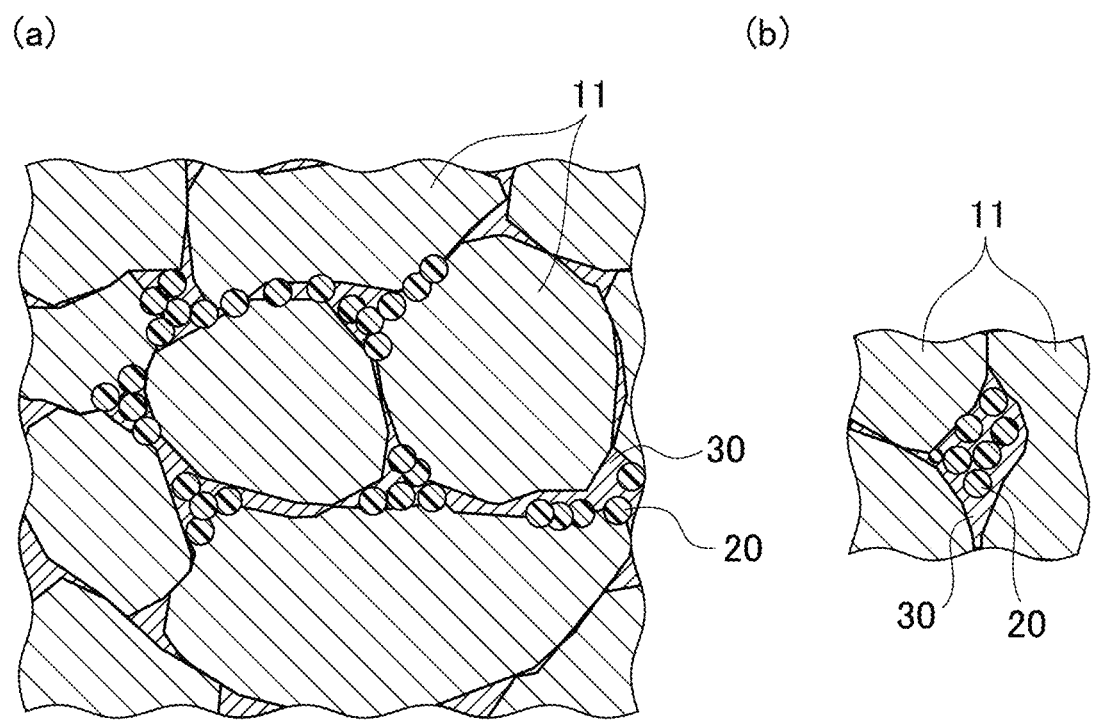
FIG. 2(a) is an enlarged schematic sectional view of the water-repellent member according to the present embodiment.
FIG. 2(b) is a schematic sectional view of the vicinity of grain boundaries of a particle group of an inorganic substance.

As illustrated in FIG. 1, a water-repellent member 100 according to the present embodiment includes a matrix part 10 made from an inorganic substance and a water-repellent resin 20 present in a dispersed state within the matrix part 10. As illustrated in FIG. 2, the matrix part 10 includes multiple particles 11 made from the inorganic substance, and the particles 11 of the inorganic substance bond with each other to form the matrix part 10.

Preferably, the inorganic substance making up the matrix part 10 contains at least one metal element selected from the group consisting of an alkali metal, an alkaline earth metal, a transition metal, a base metal, and a semimetal. In this description, the alkaline earth metal includes beryllium and magnesium in addition to calcium, strontium, barium, and radium. The base metal includes aluminum, zinc, gallium, cadmium, indium, tin, mercury, thallium, lead, bismuth, and polonium. The semimetal includes boron, silicon, germanium, arsenic, antimony, and tellurium. Among these, preferably, the inorganic substance contains at least one metal element selected from the group consisting of zinc, aluminum, and magnesium. As is described later, the inorganic substance containing the metal element described above can easily form a connection part derived from the inorganic substance by a pressure heating method.

Preferably, the inorganic substance contains at least one of an oxide or a hydroxide of the above-described metal element. More preferably, the inorganic substance contains at least one of an oxide or a hydroxide of the above-described metal element as a main component. That is, preferably, the inorganic substance contains at least one of an oxide or a hydroxide of the above-described metal element in an amount of 50 mol % or more, more preferably, in an amount of 80 mol % or more. Note that the oxide of the above-described metal element includes a phosphate, a silicate, an aluminate, and a borate in addition to a compound in which only oxygen is bonded to the metal element. Such an inorganic substance has high stability against oxygen and water vapor in the atmosphere. Accordingly, dispersing the water-repellent resin 20 inside the matrix part 10 prevents contact of the water-repellent resin 20 with oxygen and water vapor and thus reduces deterioration of the water-repellent resin 20.

Particularly preferably, the inorganic substance making up the matrix part 10 is an oxide. When the inorganic substance is made from an oxide of the above-described metal element, the water-repellent member 100 with higher durability is obtained. Note that, preferably, the oxide of the metal element is a compound in which only oxygen is bonded to the metal element.

Preferably, the inorganic substance making up the matrix part 10 is a polycrystalline substance. That is, preferably, the particles 11 of the inorganic substance are crystalline particles, and preferably, the matrix part 10 is formed by aggregating a large number of particles 11. When the inorganic substance making up the matrix part 10 is a polycrystalline substance, the water-repellent member 100 with higher durability is obtained compared to the case where the inorganic substance is made from an amorphous substance. Note that, more preferably, the particles 11 of the inorganic substance are crystalline particles containing at least one metal element selected from the group consisting of an alkali metal, an alkaline earth metal, a transition metal, a base metal, and a semimetal. Preferably, the particles 11 of the inorganic substance are crystalline particles containing at least one of an oxide or a hydroxide of the above-described metal element. More preferably, the particles 11 of the inorganic substance are crystalline particles containing at least one of an oxide or a hydroxide of the above-described metal element, as a main component.

Preferably, the inorganic substance making up the matrix part 10 is boehmite. Boehmite is an aluminum oxide hydroxide represented by a composition formula of AlOOH. Boehmite is insoluble in water and hardly reacts with acids and alkalis at room temperature, having high chemical stability. Boehmite also has excellent heat resistance due to its high dehydration temperature of around 500° C. Since boehmite has the specific gravity of about 3.07, when the matrix part 10 is made from boehmite, the water-repellent member 100 that is lightweight and excellent in chemical stability is obtained.

When the inorganic substance making up the matrix part 10 is boehmite, the particles 11 may be particles only of a boehmite phase, or particles of a mixed phase of boehmite, and aluminum oxide or aluminum hydroxide other than boehmite. For example, the particles 11 may be a mixture of a phase of boehmite and a phase of gibbsite ($Al(OH)_3$).

The average particle size of the particles 11 of the inorganic substance making up the matrix part 10 is not limited, but is more preferably 300 nm or more and 30 μm or less, still more preferably 300 nm or more and 10 μm or less, particularly preferably 300 nm or more and 5 μm or less. When the average particle size of the particles 11 of the inorganic substance is within this range, the particles 11 firmly bond with each other, increasing the strength of the matrix part 10. When the average particle size of the particles 11 of the inorganic substance is within this range, the percentage of pores present inside the matrix part 10 is 20% or less, which reduces the deterioration of the water-repellent resin 20, as described later. In this description, the value of "average particle size" is, unless otherwise stated, a value calculated as an average value of particle size of particles observed in several to several tens of visual fields by using observation means, such as a scanning electron microscope (SEM) or a transmission electron microscope (TEM).

The shape of the particles 11 of the inorganic substance is not limited, but may be spherical, for example. The particles 11 may be whisker-like (acicular) particles or scale-like particles. The whisker-like particles or the scale-like particles have higher contact with other particles compared to the spherical particles, which easily improves the strength of the matrix part 10. Therefore, using particles of such a shape for the particles 11 enhances the strength of the entire water-repellent member 100. As the particles 11, which are whisker-like, for example, particles containing at least one of zinc oxide (ZnO) or aluminum oxide ($Al_2O_3$) can be used.

In the water-repellent member 100, the matrix part 10 can be hydrophilic or hydrophobic. When the matrix part 10 is hydrophilic, a water-repellent part due to the water-repellent resin 20 and a hydrophilic part due to the inorganic substance are present on a surface 10a of the matrix part 10. A hydrophilic adherend easy to fit into the hydrophilic part is hard to fit into the water-repellent part, and a hydrophobic adherend easy to fit into the water-repellent part is hard to fit into the hydrophilic part, so that the hydrophilic adherend and the hydrophobic adherend are difficult to adhere to the surface 10a. Further, when the hydrophilic adherend and the hydrophobic adherend adhere to the surface 10a, they are easily removable.

Further, when the matrix part 10 is hydrophilic, antistatic property can be imparted to the matrix part 10. That is, for example, when moisture in the atmosphere adheres to the hydrophilic part of the matrix part 10, an electrostatic conductive path is formed on the surface of the matrix part 10. This suppresses the electrification of the matrix part 10 and reduces the adhesion of electrostatic dirt, such as dust.

Here, preferably, the inorganic substance making up the matrix part 10 does not substantially contain hydrates. In this description, "an inorganic substance does not substantially contain hydrates" means that the inorganic substance does not intentionally contain hydrates. Therefore, when a hydrate is incorporated into the inorganic substance as an unavoidable impurity, the condition "an inorganic substance does not substantially contain hydrates" is satisfied. Note that since boehmite is a metal oxide hydroxide, boehmite is not included in hydrates in this description.

Note that preferably, the inorganic substance making up the matrix part 10 does not contain a hydrate of a calcium compound. The calcium compound here is tricalcium silicate (alite, $3CaO \cdot SiO_2$), dicalcium silicate (belite, $2CaO \cdot SiO_2$), calcium aluminate ($3CaO \cdot Al_2O_3$), calcium aluminoferrite ($4CaO \cdot Al_2O_3 \cdot Fe_2O_3$), or calcium sulfate ($CaSO_4 \cdot 2H_2O$). When the inorganic substance making up the matrix part 10 contains a hydrate of the above-described calcium compound, the water-repellent member obtained may have a porosity in the section of the matrix part exceeding 20%. Thus, preferably, the inorganic substance does not contain the above-described hydrated calcium compound. Preferably, the inorganic substance making up the matrix part 10 does not contain phosphate cement, zinc phosphate cement, and calcium phosphate cement. When the inorganic substance does not contain these cements, the porosity of the water-repellent member obtained is reduced to 20% or less.

Preferably, the water-repellent resin 20 dispersed inside the matrix part 10 is a resin made from an organic compound and exhibiting water repellency. Preferably, as the water-repellent resin 20, a resin having a static contact angle with water of 90° or more is used. As the water-repellent resin 20, at least one of a fluororesin or a silicone resin can be used. Preferably, the fluororesin is at least one selected from the group consisting of polytetrafluoroethylene (PTFE), polychlorotrifluoroethylene (PCTFE), polyvinylidene fluoride (PVDF), polyvinyl fluoride (PVF), perfluoroalkoxy fluorine resin (PFA), ethylene tetrafluoride-propylene hexafluoride copolymer (FEP), ethylene-tetrafluoride ethylene copolymer (ETFE), and ethylene-chlorotrifluoroethylene copolymer (ECTFE). Preferably, the silicone resin has a siloxane bond in the molecular skeleton and a methyl group with a small surface free energy in the side chain.

Preferably, the matrix part 10 includes a group of particles of an inorganic substance in the water-repellent member 100. That is, preferably, the matrix part 10 includes the multiple particles 11 made from the inorganic substance, and the particles 11 of the inorganic substance bond with each other to form the matrix part 10. In this case, the particles 11 may be in point contact with each other, or in surface contact with each other by particle surfaces of the particles 11. Preferably, the water-repellent resin 20 is present in an approximately uniformly dispersed state inside the matrix part 10. However, preferably, the water-repellent resin 20 is present at grain boundaries of the particles 11 of the inorganic substance. As illustrated in FIG. 2, by unevenly distributing the water-repellent resin 20 among adjacent inorganic particles 11, the water-repellent resin 20 is deformed to fill gaps among the inorganic particles 11. Therefore, the ratio of pores present within the matrix part 10 is further reduced.

When the matrix part 10 includes the group of particles of the inorganic substance in the water-repellent member 100, the water-repellent resin 20 may be present among adjacent particles 11 of the inorganic substance. However, as illustrated in FIG. 2, in addition to the water-repellent resin 20, there may be an amorphous part 30 containing an amorphous inorganic compound among the adjacent particles 11 of the inorganic substance. The presence of the amorphous part 30 allows the adjacent particles 11 of the inorganic substance to bond with each other via the amorphous part 30, further increasing the strength of the matrix part 10. Note that preferably, the amorphous part 30 is present to contact at least surfaces of the particles 11 of the inorganic substance. The amorphous part 30 may be present between the particles 11 of the inorganic substance and the water-repellent resin 20 and among the adjacent water-repellent resin 20 in addition to among the adjacent particles 11 of the inorganic substance.

Preferably, the amorphous part 30 contains an amorphous inorganic compound. Specifically, the amorphous part 30 may be a part made of only the amorphous inorganic compound or a mixture of the amorphous inorganic compound and a crystalline inorganic compound. The amorphous part 30 may be a part in which the crystalline inorganic compound is dispersed inside the amorphous inorganic compound.

Preferably, the particles 11 of the inorganic substance and the amorphous part 30 contain the same metal element, and preferably, the metal element is at least one selected from the group consisting of an alkali metal, an alkaline earth metal, a transition metal, a base metal, and a semimetal. That is, preferably, the inorganic compound making up the particles 11 and the amorphous inorganic compound making up the amorphous part 30 contain at least the same metal element. The inorganic compound making up the particles 11 and the amorphous inorganic compound making up the amorphous part 30 may have the same chemical composition or may have different chemical compositions. Specifically, when the metal element is zinc, the inorganic compound making up the particles 11 and the amorphous inorganic compound making up the amorphous part 30 may both be zinc oxide (ZnO). Alternatively, while the inorganic compound making up the particles 11 is ZnO, the amorphous inorganic compound making up the amorphous part 30 may be a zinc-containing oxide other than ZnO.

When the amorphous part 30 is a part in which the amorphous inorganic compound and the crystalline inorganic compound are mixed, the amorphous inorganic compound and the crystalline inorganic compound may have the same chemical composition or may have different chemical compositions from each other.

In the water-repellent member 100, preferably, the particles 11 and the amorphous part 30 contain an oxide of at least one metal element selected from the group consisting of an alkali metal, an alkaline earth metal, a transition metal, a base metal, and a semimetal. Since the oxide of such a metal element has high durability, contact of the water-repellent resin 20 with oxygen and water vapor is prevented for a long time, and deterioration of the water-repellent resin 20 is reduced.

Preferably, the oxide of the metal element contained in both the particles 11 and the amorphous part 30 is at least one selected from the group consisting of zinc oxide, magnesium oxide, and a composite of zinc oxide and magnesium oxide. As is described later, by using these oxides of the metal element, the amorphous part 30 is formed by a simple method.

As described above, the inorganic substance making up the matrix part 10 may be boehmite. In this case, the particles 11 of the matrix part 10 may be particles only of a boehmite phase, or particles of a mixed phase of boehmite, and aluminum oxide or aluminum hydroxide other than boehmite. In this case, preferably, the adjacent particles 11 are bonded through at least one of an oxide or an oxide hydroxide of aluminum. That is, preferably, the particles 11 are not bonded by an organic binder of an organic compound and are not also bonded by an inorganic binder of an inorganic compound except for an oxide and an oxide hydroxide of aluminum. Note that when the adjacent particles 11 are bonded through at least one of an oxide or an oxide hydroxide of aluminum, the oxide and the oxide hydroxide of aluminum may be crystalline, or amorphous.

Note that when the matrix part 10 is made from boehmite, the presence ratio of the boehmite phase is preferably 50% by mass or more, more preferably 60% by mass or more, still more preferably 70% by mass or more. By increasing the ratio of the boehmite phase, the matrix part 10 that is lightweight and excellent in chemical stability and heat resistance is obtained. Note that the ratio of the boehmite phase in the matrix part 10 is obtained by measuring the X-ray diffraction pattern of the matrix part 10 by an X-ray diffraction method and then performing a Rietveld analysis.

In the water-repellent member 100, preferably, the porosity in the section of the matrix part 10 is 20% or less. That is, when the section of the matrix part 10 is observed, preferably, the average value of the percentage of pores per unit area is 20% or less. When the porosity is 20% or less, the water-repellent resin 20 is sealed inside the dense inorganic substance. Thus, the ratio of the water-repellent resin 20 contacting with oxygen and water vapor from the outside of the water-repellent member 100 decreases, which reduces the oxidative decomposition of the water-repellent resin 20 and maintains the water repellency of the water-repellent resin 20 for a long time. The porosity in the section of the matrix part 10 is preferably 15% or less, more preferably 10% or less, still more preferably 5% or less. As the porosity in the cross section of the matrix part 10 is smaller, the contact of the water-repellent resin 20 with oxygen and water vapor is more prevented, which reduces the deterioration of the water-repellent resin 20.

In this description, the porosity is determined as follows. First, the section of the matrix part 10 is observed to discriminate the matrix part 10, the water-repellent resin 20, and the pores. Then, the unit area and the area of pores in that unit area are measured to obtain the ratio of pores per unit area. After the ratio of pores per unit area is obtained at multiple locations, the average value of the ratio of pores per unit area is taken as the porosity. Note that when the section of the matrix part 10 is observed, an optical microscope, a scanning electron microscope (SEM), or a transmission electron microscope (TEM) can be used. The unit area and the area of pores in that unit area may be measured by binarizing an image observed with a microscope.

The shape of the water-repellent member 100 is not limited, but may be, for example, a plate shape. A thickness t of the water-repellent member 100 (matrix part 10) is not limited, but may be, for example, 50 μm or more. As described above, the surface layer of Patent Literature 1 is formed by a sol-gel method, and thus only a thin film of several μm or less is obtained. However, the water-repellent member 100 according to the present embodiment is formed by a pressure heating method, as described later. Thus, the water-repellent member 100 having a large thickness is easily obtained. The thickness t of the water-repellent member 100 (matrix part 10) may be 1 mm or more. The thickness t of the water-repellent member 100 (matrix part 10) may be 1 cm or more. The upper limit of the thickness t of the water-repellent member 100 (matrix part 10) is not limited, but may be, for example, 50 cm.

Figure 3:
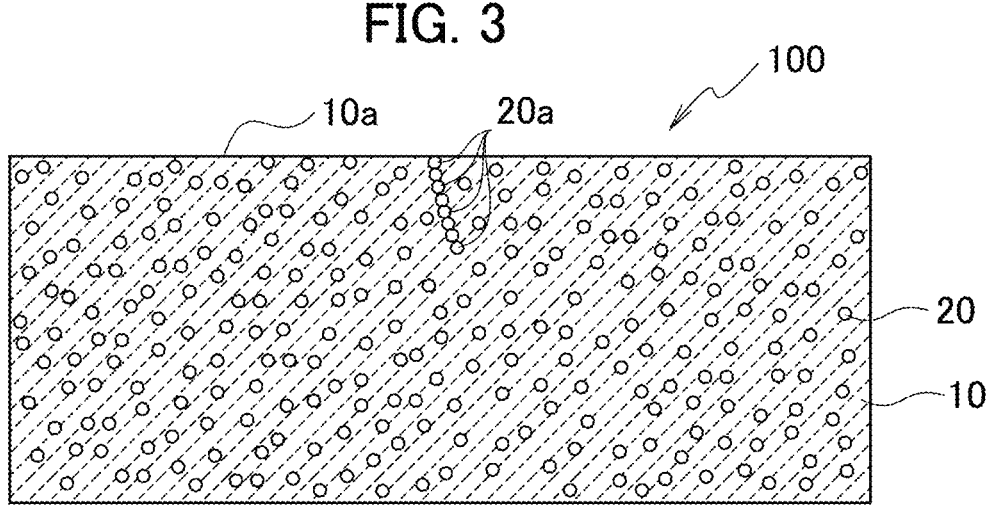
FIG. 3 is a schematic sectional view of another example of the water-repellent member according to the present embodiment.

In the water-repellent member 100, preferably, the water-repellent resin 20 is not continuously present from a surface 10a of the matrix part 10 to the inside of the matrix part 10 and is not present in the form of a film on the surface 10a of the matrix part 10. Specifically, preferably, the water-repellent resin 20 is present in a dispersed state inside the matrix part 10. A part of the water-repellent resin 20 may be segregated inside the matrix part 10. However, preferably, a water-repellent resin 20a segregated is not continuously present from the surface 10a to the inside of the matrix part 10 as illustrated in FIG. 3. The water-repellent resin 20a present on the surface 10a of the matrix part 10 may deteriorate by contact with oxygen and water vapor in the atmosphere. The water-repellent resin 20a continuously present from the surface 10a to the inside of the matrix part 10 may also deteriorate due to the oxidative deterioration of the water-repellent resin 20a present on the surface 10a. Therefore, from the viewpoint of reducing the deterioration of the water-repellent resin 20, preferably, the water-repellent resin 20 is not continuously present from the surface 10a to the inside of the matrix part 10.

With respect to the water-repellent resin 20 dispersed in the matrix part 10, preferably, a part of the water-repellent resin 20 is not present in a film shape on the surface 10a of the matrix part 10. In this case, the water-repellent resin 20 in a film shape may oxidize and deteriorate due to exposure to oxygen and water vapor in the atmosphere.

Figure 4:
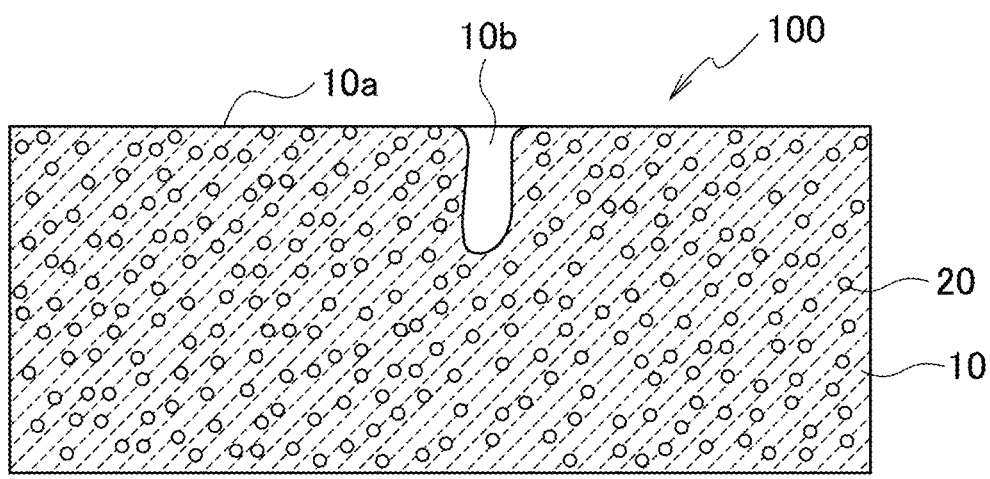
FIG. 4 is a schematic sectional view of another example of the water-repellent member according to the present embodiment.

In the water-repellent member 100, preferably, the matrix part 10 has no gap 10b communicating from the surface 10a to the inside of the matrix part 10. The water-repellent resin 20 inside the matrix part 10 is covered with the particles 11 of the inorganic substance and thus hardly oxidizes and deteriorates. However, as illustrated in FIG. 4, when the gap 10b is present in the matrix part 10, oxygen and water vapor may reach the inside of the matrix part 10 through the gap 10b and may contact with the water-repellent resin 20 inside the matrix part 10. Thus, from the viewpoint of reducing the oxidative deterioration of the water-repellent resin 20, preferably, the matrix part 10 does not have the gap 10b communicating from the surface 10a to the inside.

As described above, the water-repellent member 100 according to the present embodiment includes the matrix part 10 made from an inorganic substance containing at least one of a metal oxide or a metal hydroxide, and the water-repellent resin 20 present in a dispersed state inside the matrix part 10. The porosity in the section of the matrix part 10 is 20% or less. The water-repellent member 100 has the water-repellent resin 20 dispersed through the entire interior of the matrix part 10. That is, within the matrix part 10, particles of the water-repellent resin 20 do not aggregate but exist in a monodisperse state. Thus, the water-repellent member 100 as a whole has water repellency and maintains the water repellency when processed. In contrast, in the case of the water-repellent surface layer is provided on the substrate as in Patent Literature 1, surface processing is not possible because the surface layer is removed when the surface is processed.

The water-repellent member 100 has the porosity of 20% or less in the section. Thus, the ratio of the water-repellent resin 20 contacting with oxygen and water vapor decreases, which reduces the oxidative decomposition of the water-repellent resin 20 and maintains the water repellency of the water-repellent member 100 for a long time. Since the matrix part 10 has few internal pores and the inorganic substance is dense, the water-repellent member 100 is a ceramic member having high strength.

As described above, the antifouling member in Patent Literature 1 may have the surface layer peeled off due to the difference in the thermal expansion coefficient between the substrate and the surface layer. However, the water-repellent member 100 has the water-repellent resin 20 highly dispersed in the matrix part 10, having no peeling issue and maintaining high stability for a long time.

Preferably, in the water-repellent member 100, the matrix part 10 has a volume ratio larger than that of the water-repellent resin 20. The water-repellent member 100 controls the water repellency of the water-repellent member 100 by changing the volume ratio of the matrix part 10 that is hydrophilic to the water-repellent resin 20 that is water repellent. That is, by increasing the volume ratio of the matrix part 10 to be higher than that of the water-repellent resin 20, the periphery of the water-repellent resin 20 is easily covered with the particles 11 of the inorganic substance, suppressing the water-repellency of the water-repellent member 100. In contrast, by increasing the volume ratio of the water-repellent resin 20 to be higher than that of the matrix part 10, the water-repellent resin 20 is increased, further enhancing the water-repellency of the water-repellent member 100. However, from the viewpoint of further reducing the deterioration of the water-repellent resin 20, preferably, the volume ratio of the matrix part 10 is larger than that of the water-repellent resin 20.

Preferably, the water-repellent member 100 has a static contact angle with water of 90° or more. When the static contact angle of the water-repellent member 100 is 90° or more, dirt, such as fur, hardly adheres and is easily removable if it adheres. Preferably, the water-repellent member 100 has a static contact angle with water of 100° or more.

Next, a method for manufacturing the water-repellent member 100 according to the present embodiment is described. The water-repellent member 100 is manufactured by pressurizing and heating a mixture of particles of an inorganic substance and a water-repellent resin in a state containing a solvent. By using such a pressure heating method, a part of the inorganic substance is eluted, and the inorganic substance is bonded to each other, forming the matrix part 10 with the water-repellent resin 20 dispersed therein.

Specifically, first, an inorganic substance powder and a water-repellent resin powder are mixed to prepare a mixed powder. The method for mixing the inorganic substance powder and the water-repellent resin powder is not limited and may be carried out by a dry or wet process. The inorganic substance powder and the water-repellent resin powder may be mixed in air or in an inert atmosphere.

Next, a solvent is added to the mixed powder. The solvent is not limited, but for example, one dissolving a part of the inorganic substance when the mixed powder is pressurized and heated can be used. As the solvent, one reacting with the inorganic substance to form another inorganic substance different from said inorganic substance can be used. As such a solvent, at least one selected from the group consisting of an acidic aqueous solution, an alkaline aqueous solution, water, an alcohol, a ketone, and an ester can be used. As the acidic aqueous solution, an aqueous solution with a pH of 1 to 3 can be used. As the alkaline aqueous solution, an aqueous solution with a pH of 10 to 14 can be used. As the acidic aqueous solution, preferably, an aqueous solution of an organic acid is used. As the alcohol, preferably, an alcohol with 1 to 12 carbon atoms is used.

The mixture containing the inorganic substance, the water-repellent resin, and the solvent is prepared by mixing the inorganic substance powder and the water-repellent resin powder, and then adding the solvent, as described above. However, a method for preparing the mixture containing the inorganic substance, the water-repellent resin, and the solvent is not limited to such a method. The method for preparing the mixture includes first mixing the water-repellent resin and the solvent. In this case, the water-repellent resin may or may not be dissolved in the solvent. Then, by adding the inorganic substance powder to the mixture of the water-repellent resin and the solvent, the mixture containing the inorganic substance, the water-repellent resin, and the solvent may be prepared.

The mixture containing the inorganic substance, the water-repellent resin, and the solvent is then filled inside the mold. After filling the mold with the mixture, the mold may be heated as necessary. Then, by applying pressure to the mixture inside the mold, the inside of the mold becomes a high pressure state. At this time, the inorganic substance and the water-repellent resin are densified, and at the same time, particles of the inorganic substance bond with each other.

When a solvent that dissolves a part of an inorganic substance is used, an inorganic compound making up the inorganic substance is dissolved in the solvent under high pressure. The inorganic compound dissolved penetrates a gap between the inorganic substance and the water-repellent resin, a gap among the inorganic substance, and a gap among the water-repellent resin. Then, the solvent in the mixture is removed in this state to form a connection part derived from the inorganic substance between the inorganic substance and the water-repellent resin, among the inorganic substance, and among the water-repellent resin. When a solvent that reacts with an inorganic substance to form another inorganic substance different from said inorganic substance is used, an inorganic compound making up the inorganic substance reacts with the solvent under high pressure. Then, the other inorganic substance generated by the reaction is filled in the gap between the inorganic substance and the water-repellent resin, the gap among the inorganic substance, and the gap among the water-repellent resin to form a connection part derived from the other inorganic substance.

When a solvent that dissolves a part of an inorganic substance is used, heating and pressurizing conditions of the mixture containing the inorganic substance, the water-repellent resin, and the solvent are not limited as long as the conditions are such that dissolution of the surface of the inorganic substance progresses. When a solvent that reacts with an inorganic substance to form another inorganic substance different from said inorganic substance is used, heating and pressurizing conditions of the mixture are not limited as long as the reaction between the inorganic substance and the solvent proceeds. For example, preferably, the mixture containing the inorganic substance, the water-repellent resin, and the solvent is heated to 50 to 300° C. and then pressurized at a pressure of 10 to 600 MPa. Note that the temperature at which the mixture containing the inorganic substance, the water-repellent resin, and the solvent is heated is more preferably 80 to 250° C., still more preferably 100 to 200° C. The pressure at which the mixture containing the inorganic substance, the water-repellent resin, and the solvent is pressurized is more preferably 50 to 400 MPa, more preferably 50 to 200 MPa.

Then, by taking out the molded body from the inside of the mold, the water-repellent member 100 is obtained. Note that, preferably, the connection part derived from the inorganic substance formed between the inorganic substance and the water-repellent resin, among the inorganic substance, and among the water-repellent resin is the amorphous part 30 described above.

As a method for producing an inorganic member made from a ceramic, a sintering method has been known. The sintering method is a method for obtaining a sintered body by heating an aggregate of a solid powder made from an inorganic substance at a temperature lower than the melting point. However, in the sintering method, the solid powder is heated to 1000° C. or higher, for example. Therefore, when the sintering method is used to obtain a water-repellent member made from the inorganic substance and the water-repellent resin, the water-repellent resin carbonizes due to heating at a high temperature, obtaining no water-repellent member. However, in the manufacturing method for the water-repellent member 100 according to the present embodiment, the mixture formed by mixing the inorganic substance powder and the water-repellent resin powder is heated at a low temperature of 300° C. or less, and thus the water-repellent resin hardly carbonizes. This enables the water-repellent resin 20 to be stably dispersed inside the matrix part 10 made from the inorganic substance and thus gives water repellency.

Further, in the manufacturing method according to the present embodiment, since the mixture of the inorganic substance powder and the water-repellent resin powder is pressurized while being heated, the inorganic substance is aggregated to form the matrix part 10 that is dense. As a result, the number of pores inside the matrix part 10 is reduced, and thus the water-repellent member 100 is obtained that has high strength while reducing the oxidative deterioration of the water-repellent resin 20.

Next, a method for manufacturing the water-repellent member 100 is described in which the inorganic substance making up the matrix part 10 is boehmite. The water-repellent member in which the inorganic substance is boehmite is produced by mixing a hydraulic alumina, a water-repellent resin, and a solvent containing water, and then pressurizing and heating the mixture. The hydraulic alumina is an oxide obtained by heat-treating aluminum hydroxide and contains ρ alumina. Such hydraulic alumina has the property of bonding and curing by hydration reaction. Therefore, by using the pressure heating method, the hydration reaction of the hydraulic alumina progresses to have the hydraulic alumina bonded to each other while the crystal structure is changed to boehmite, so that the matrix part 10 is formed.

Specifically, a hydraulic alumina powder, a water-repellent resin, and a solvent containing water are first mixed to prepare a mixture. Preferably, the solvent containing water is pure water or ion exchange water. However, the solvent containing water may contain an acidic substance or an alkaline substance, in addition to water. As long as the solvent containing water contains water as a main component, the solvent containing water may contain, for example, an organic solvent (for example, an alcohol).

Preferably, the amount of the solvent added to the hydraulic alumina is an amount in which the hydration reaction of the hydraulic alumina sufficiently progresses. The amount of the solvent added is preferably 20 to 200% by mass to the hydraulic alumina, more preferably 50 to 150% by mass to the hydraulic alumina.

Next, the mixture formed by mixing the hydraulic alumina, the water-repellent resin, and the solvent containing water is filled inside the mold. After filling the mold with the mixture, the mold may be heated as necessary. By applying pressure to the mixture inside the mold, the inside of the mold becomes a high pressure state. At this time, the hydraulic alumina becomes highly filled, and particles of the hydraulic alumina bond with each other, resulting in high density. Specifically, by adding water to the hydraulic alumina, the hydraulic alumina undergoes a hydration reaction to form boehmite and aluminum hydroxide on the surface of particles of the hydraulic alumina. By pressurizing the mixture in the mold while heating, the boehmite and aluminum hydroxide generated mutually diffuse among adjacent hydraulic alumina particles, so that the hydraulic alumina particles gradually bond with each other. Then, the dehydration reaction proceeds by heating, and the crystal structure changes from aluminum hydroxide to boehmite. It is supposed that the hydration reaction of the hydraulic alumina, the mutual diffusion among the hydraulic alumina particles, and the dehydration reaction proceed almost simultaneously.

When the molded body is taken out from the inside of the mold, the water-repellent member is obtained in which the particles 11 bond with each other via at least one of the oxide or the oxide hydroxide of aluminum, and further the water-repellent resin is dispersed.

Heating and pressurizing conditions of the mixture formed by mixing the hydraulic alumina, the water-repellent resin, and the solvent containing water are not limited as long as the reaction between the hydraulic alumina and the solvent progresses. For example, preferably, the mixture formed by mixing the hydraulic alumina, the water-repellent resin, and the solvent containing water is pressurized at a pressure of 10 to 600 MPa while being heated to 50 to 300° C. Note that the temperature at which the mixture formed by mixing the hydraulic alumina, the water-repellent resin, and the solvent containing water is heated is more preferably 80 to 250° C., still more preferably 100 to 200° C. The pressure at which the mixture formed by mixing the hydraulic alumina, the water-repellent resin, and the solvent containing water is pressurized is more preferably 50 to 600 MPa, still more preferably 200 to 600 MPa.

As described above, the method for producing the water-repellent member includes a step of mixing an inorganic substance powder with an water-repellent resin powder to obtain a mixture, and a step of adding a solvent dissolving an inorganic substance or a solvent reacting with the inorganic substance to the mixture, and then pressurizing and heating the mixture. The method for producing the water-repellent member includes a step of mixing a water-repellent resin with a solvent dissolving an inorganic substance or a solvent reacting with the inorganic substance, a step of mixing an inorganic substance powder with the solvent containing the water-repellent resin to obtain a mixture, and a step of pressurizing and heating the mixture. Preferably, heating and pressurizing conditions of the mixture are a temperature of 50 to 300° C. and a pressure of 10 to 600 MPa. In the manufacturing method according to the present embodiment, since the water-repellent member 100 is formed under such a low temperature condition, carbonization of the water-repellent resin 20 is reduced so that a ceramic member having water repellency is obtained.

The method for producing the water-repellent member 100 in which the inorganic substance is boehmite includes a step of mixing the hydraulic alumina, the water-repellent resin, and the solvent containing water to obtain the mixture, and a step of pressurizing and heating the mixture. Preferably, heating and pressurizing conditions of the mixture are a temperature of 50 to 300° C. and a pressure of 10 to 600 MPa. In this manufacturing method, the water-repellent member is formed under such a low temperature condition, and thus the obtained member is mainly made from boehmite phase. Therefore, the water-repellent member that is lightweight and excellent in chemical stability is obtained by a simple method.

To smooth the surface of the water-repellent member 100, the surface 10a of the matrix part 10 may be polished. When the surface 10a of the matrix part 10 is polished, the water-repellent resin 20 exposed from the surface 10a may be spread by the polishing to form a thin film of the water-repellent resin 20 on the surface 10a. In this case, the water-repellent resin 20 in a thin film form improves the water repellency of the entire surface of the water-repellent member 100. As being exposed on the surface 10a of the matrix part 10, the water-repellent resin 20 in a thin film form may contact with oxygen and water vapor, resulting in oxidative deterioration. However, the water-repellent resin 20 within the matrix part 10 is prevented from oxidative deterioration as described above. Therefore, when the water-repellent resin 20 in a thin film form deteriorates and the water-repellency decreases, the water-repellent resin 20 inside the matrix part 10 can be exposed by polishing the surface of the water-repellent member 100, thereby restoring the water-repellency.

[Building Member and Wet Room Member]

Next, a building member and a wet room member according to the present embodiment are described.

The building member according to the present embodiment includes the water-repellent member 100 described above. The building member is a member manufactured for construction, in which the water-repellent member 100 is used at least partially in the present embodiment. As described above, the water-repellent member 100 can be formed in a plate shape having a large thickness, and is excellent in scratch resistance in addition to high strength and durability. The water-repellent member 100 is cuttable in the same manner as a general ceramic member and maintains the water repellency derived from the water-repellent resin 20 when the surface is processed. Therefore, the water-repellent member 100 is suitably usable as a building member. The building member is not limited, but for example, an exterior wall material (siding), a roof material, and the like are mentioned. Materials for roads and materials for outer grooves are also mentioned as the building member.

As described above, in the water-repellent member 100, preferably, the matrix part 10 is hydrophilic. In this case, the water-repellent part and the hydrophilic part exist on the surface 10a of the matrix part 10, and thus both the hydrophilic adherend and the hydrophobic adherend are difficult to attach thereto. Therefore, the building member using the water-repellent member 100 is difficult for dirt to adhere, maintaining a good appearance for a long time.

The wet room member according to the present embodiment includes the above-described water-repellent member 100. Examples of the wet room member include members used in a kitchen, a bathroom, a toilet, and a washstand. The water-repellent member 100 is excellent in scratch resistance in addition to high strength and durability as described above. The water-repellent member 100 is cuttable in the same manner as a general ceramic member and maintains the water repellency derived from the water-repellent resin 20 when the surface is processed. In this way, the water-repellent member 100 is suitably usable as a wet room member since dirt, such as fur, is hard to adhere and is removable if it adheres.

EXAMPLES

The water-repellent member according to the present embodiment is described in more detail with reference to examples and reference examples below, but the present embodiment is not limited thereto.

Example 1

(Preparation of Test Sample)

Example 1-1

Zinc oxide particles having an average particle size $D_{50}$ of about 1 μm (manufactured by Kojundo Chemical Laboratory Co., Ltd., purity 99.99%) were prepared as the inorganic particles. Polytetrafluoroethylene particles (PTFE fine powder KTL-8N, manufactured by Taki Chemical Co., Ltd.) having an average particle size $D_{50}$ of about 4 μm were prepared as the water-repellent resin. After the PTFE particles were weighed to be 9% by volume of the zinc oxide particles, the zinc oxide particles and the PTFE particles were wet-mixed with acetone using a mortar and pestle made of agate to obtain a mixed powder.

Next, the mixed powder obtained was put into a cylindrical molding die (φ10) having an internal space. Furthermore, 1M acetic acid was added to the mixed powder filled inside the molding die to be 200 μL per 1 g of zinc oxide particles. Then, the test sample of the present example was obtained by heating and pressurizing the mixed powder containing the acetic acid under the condition of 50 MPa, 150° C., and 30 minutes.

Comparative Example 1-1

A test sample of this example was obtained in the same manner as in example 1-1 except that the polytetrafluoroethylene particles were not added.

(Evaluation of Test Samples)

<Surface Observation>

As a result of visually observing the test samples of example 1-1 and comparative example 1-1, the surfaces of the test samples each showed a while color derived from the zinc oxide particles. Further, the test samples of example 1-1 and comparative example 1-1 had high hardness like a sintered body.

<Contact Angle Measurement>

First, to smooth the surfaces of the test samples of example 1-1 and comparative example 1-1, the surfaces of the test samples were polished by hand for 1 minute using abrasive paper. At this time, Kovax P2000 (#2000) of Refine Tec Ltd. was used as the abrasive paper. Then, the test samples polished were blown with air using an air duster to remove dust from the surfaces.

Next, the static contact angle to ion-exchanged water in the test samples of example 1-1 and comparative example 1-1 was measured using an automatic contact angle meter (CAW150) manufactured by Kyowa Interface Science Co., Ltd. Specifically, the static contact angle was measured at three positions on each of the polished surfaces of the test samples of example 1-1 and comparative example 1-1, and each average value was set as the static contact angle of each test sample.

The test sample of example 1-1 had the static contact angles of 108.3°, 106.8°, and 108.2°, respectively, and the static contact angle of the test sample of example 1-1 was 107.8°. The test sample of comparative example 1-1 had the static contact angles of 53.1°, 45.1°, and 66.5°, respectively, and the static contact angle of the test sample of comparative example 1-1 was 55.8°.

<Porosity Measurement>

Figure 5:
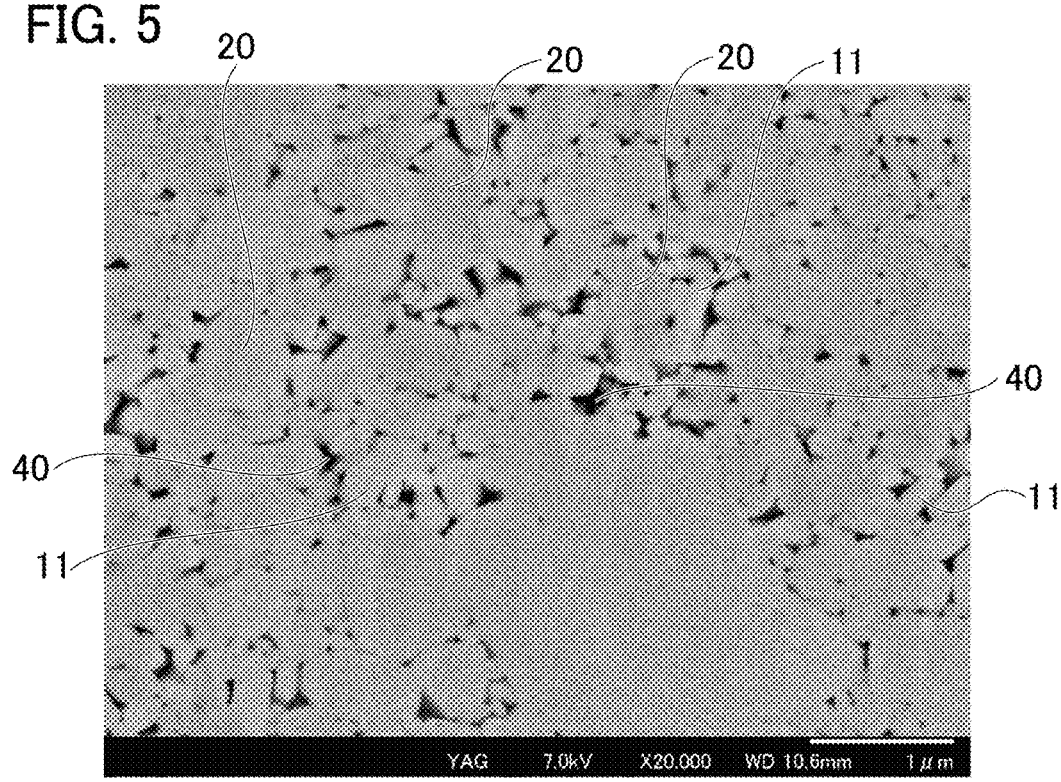
FIG. 5 is a diagram illustrating a back-scattered electron image at position 1 in a test sample according to example 1-1.
Figure 7:
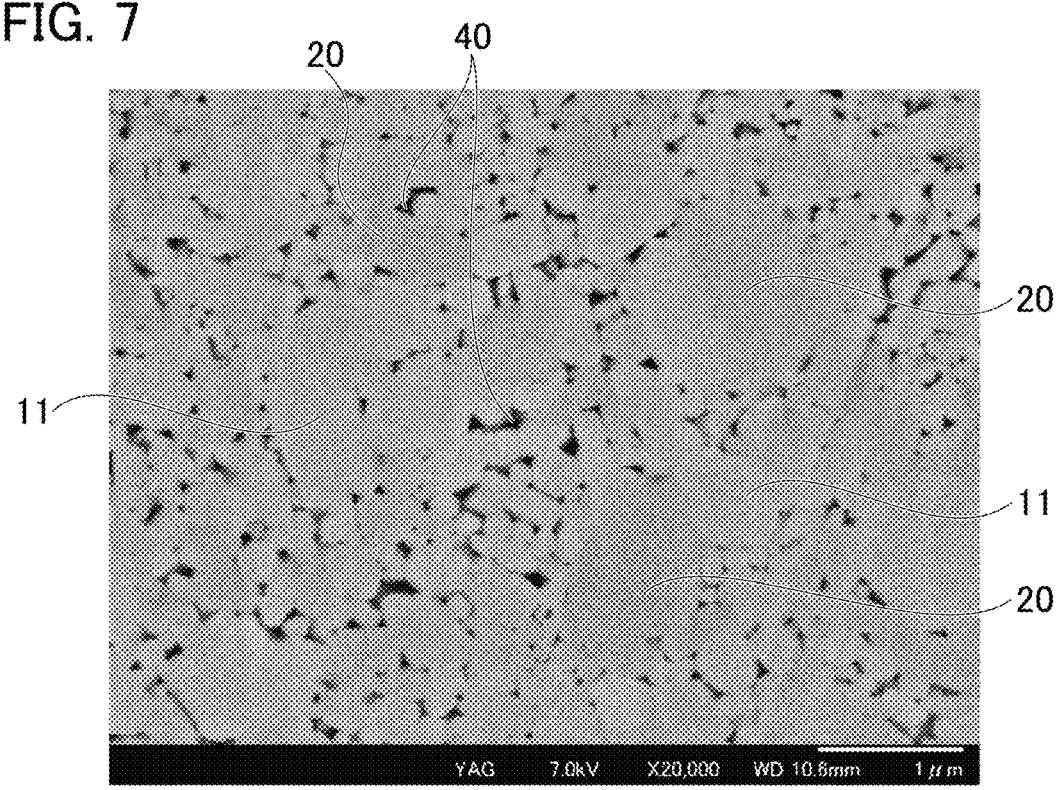
FIG. 7 is a back-scattered electron image at position 2 in the test sample according to example 1-1.
Figure 9:
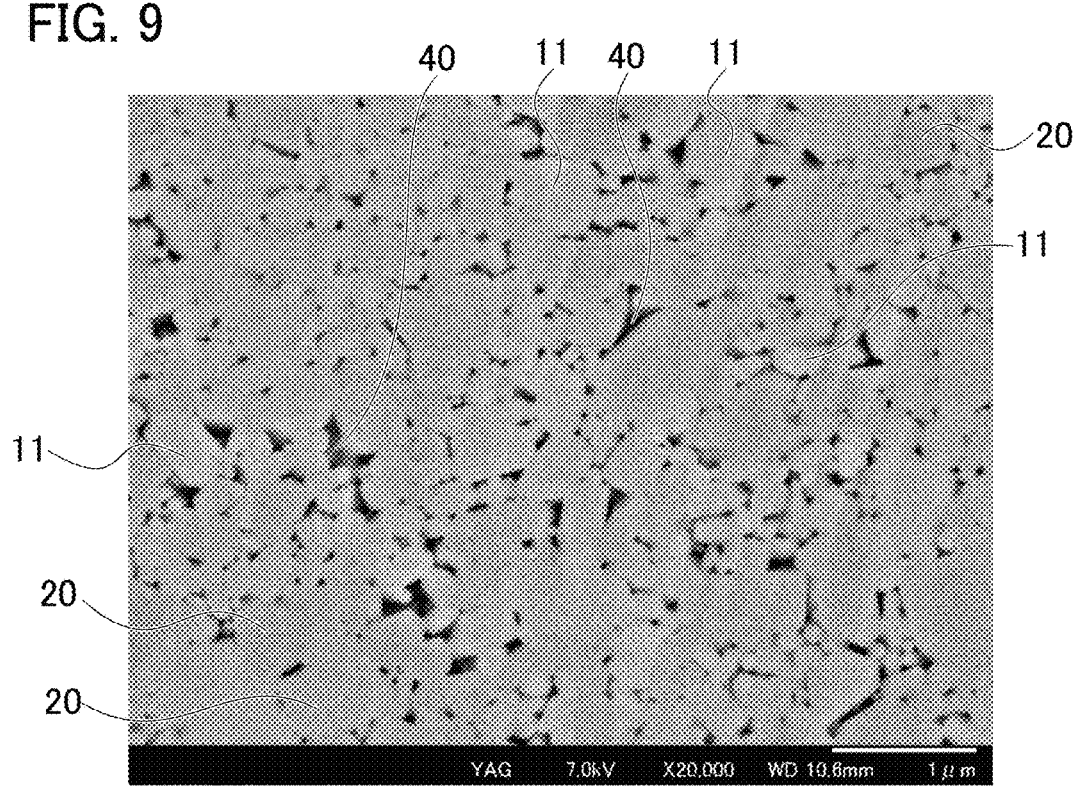
FIG. 9 is a diagram illustrating a back-scattered electron image at position 3 in the test sample according to example 1-1.

First, cross section polisher processing (CP processing) was applied to the section of the test sample of example 1-1 having a cylindrical shape. Next, using a scanning electron microscope (SEM), a back-scattered electron image was observed at a magnification of 20,000 on the section of the test sample. FIGS. 5, 7, and 9 show back-scattered electron images obtained by observing three points (positions 1 to 3) in the section of the test sample. In the observed back-scattered electron images, white particles indicate zinc oxide (particles 11 of the inorganic substance), particles that appear slightly black indicate the water-repellent resin 20, and a black portion indicates a pore 40.

Figure 6:
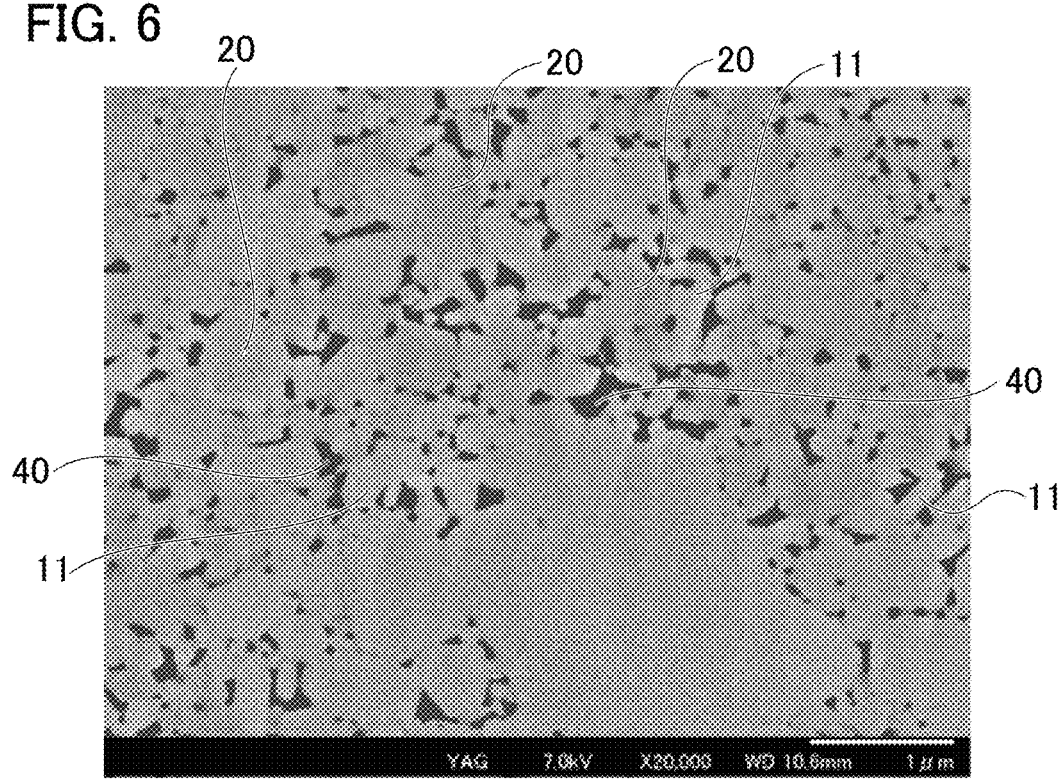
FIG. 6 is a diagram illustrating binarized data of the back-scattered electron image at position 1 in the test sample according to example 1-1.
Figure 8:
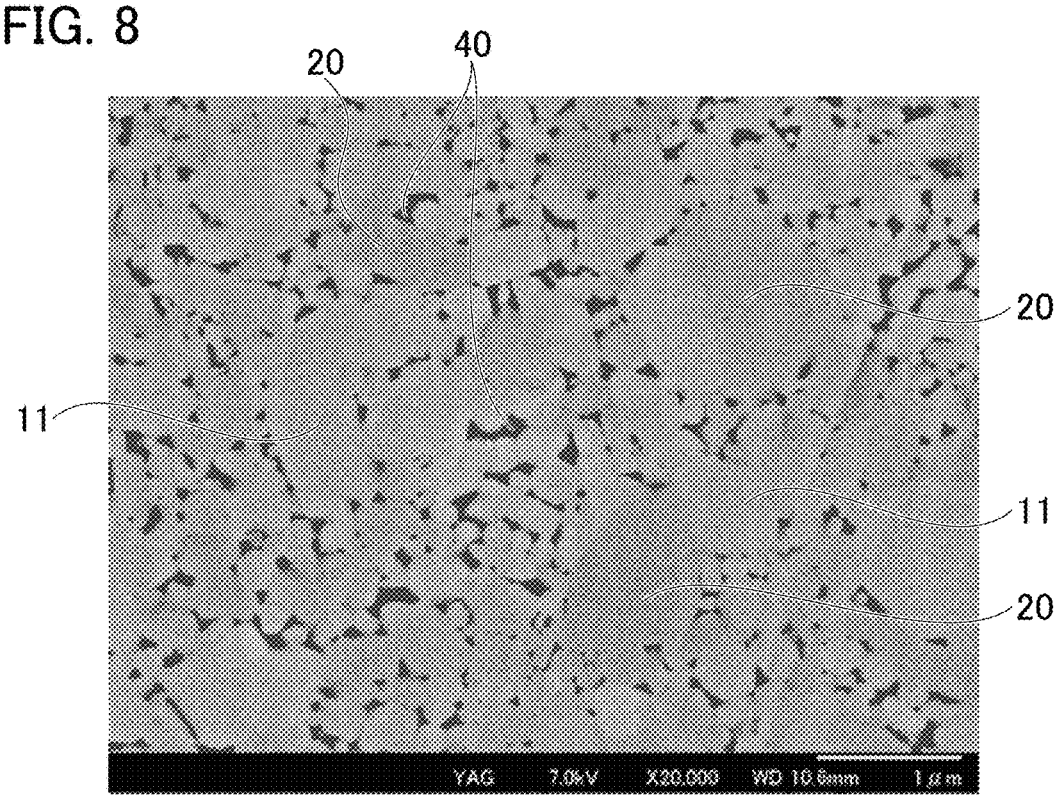
FIG. 8 is a diagram illustrating binarized data of the back-scattered electron image at position 2 in the test sample according to example 1-1.
Figure 10:
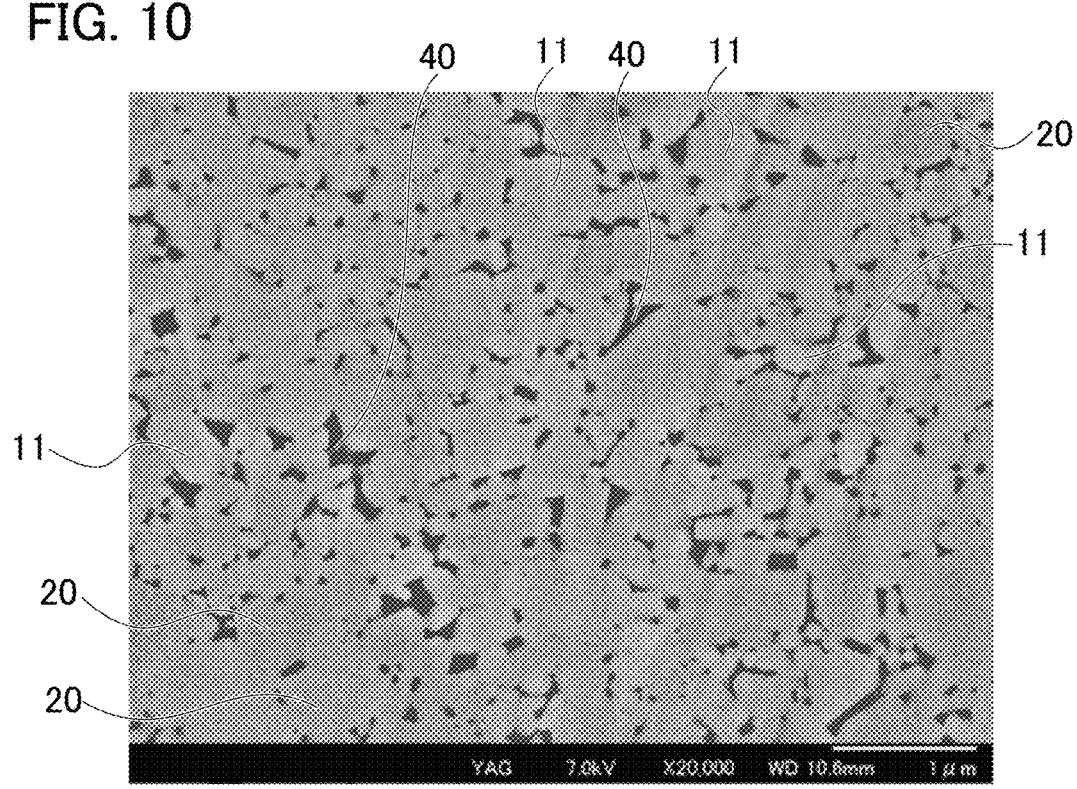
FIG. 10 is a diagram illustrating binarized data of the back-scattered electron image at position 3 in the test sample according to example 1-1.

Next, by binarizing the SEM images of the three fields, the pore portions were clarified. The binarized images of the back-scattered electron images of FIGS. 5, 7, and 9 are illustrated in FIGS. 6, 8, and 10, respectively. Then, the area ratio of the pore portion was calculated from the binarized images, and the average value was taken as the porosity. Specifically, in FIG. 6, the area ratio of the pore portion at position 1 was 4.7%. In FIG. 8, the area ratio of the pore portion at position 2 was 4.3%. In FIG. 10, the area ratio of the pore portion at position 3 was 4.9%. Therefore, the porosity of the test sample of example 1-1 was 4.6%, which is the average value of the area ratio of the pore portion at positions 1 to 3.

As described above, since the water-repellent resin was present in a dispersed state, the test sample of example 1-1 had water repellency. It is seen from FIGS. 5, 7, and 9 that the water-repellent resin is present at grain boundaries of the zinc oxide particles. The porosity of the test sample is less than 10%, which indicates that the water-repellent resin is prevented from contacting with air and water vapor, thus reducing oxidative deterioration.

Example 2

(Preparation of Test Sample)

Example 2-1

Zinc oxide particles same as those in example 1-1 were prepared as the inorganic particles. Polytetrafluoroethylene particles same as those in example 1-1 were prepared as the water-repellent resin. After the PTFE particles were weighed to be 10% by volume of the zinc oxide particles, the zinc oxide particles and the PTFE particles were wet-mixed with acetone using a mortar and pestle made of agate to obtain a mixed powder.

Next, the mixed powder obtained was put into a cylindrical molding die (φ10) having an internal space. Furthermore, 1M acetic acid was added to the mixed powder filled inside the molding die to be 200 μL per 1 g of zinc oxide particles. Then, a molded body was obtained by heating and pressurizing the mixed powder containing the acetic acid under the condition of 50 MPa, 150° C., and 30 minutes.

Next, to smooth the surface of the molded body, the surface of the molded body was polished by hand for 1 minute using abrasive paper. The abrasive paper used was the same as that used in example 1. Then, the molded body polished was blown with air using an air duster to remove dust from the surface, and the test sample of this example was obtained.

Example 2-2

A molded body was obtained in the same manner as in example 2-1 except that the PTFE particles were added to be 20% by volume of the zinc oxide particles. The test sample of this example was obtained by further polishing the molded body in the same manner as in example 2-1.

Example 2-3

In the same manner as in example 2-1, a molded body was obtained by adding the PTFE particles to be 10% by volume of the zinc oxide particles. In this example, the molded body was used as a test sample without any polishing process.

Example 2-4

In the same manner as in example 2-2, a molded body was obtained by adding the PTFE particles to be 20% by volume of the zinc oxide particles. In this example, the molded body was used as a test sample without any polishing process. In example 2-4, three test samples were prepared in the same manner.

Comparative Example 2-1

A molded body was obtained in the same manner as in example 2-1 except that polytetrafluoroethylene particles were not added. The test sample of this example was obtained by further polishing the molded body in the same manner as in example 2-1.

Comparative Example 2-2

A molded body was obtained in the same manner as in example 2-1 except that polytetrafluoroethylene particles were not added. In this example, the molded body was used as a test sample without any polishing process.

Tables 1 and 2 show the amount of PTFE particles added and the presence or absence of the polishing process in the test samples of examples 2-1 to 2-4 and comparative examples 2-1 to 2-2.

TABLE 1

|  | Comparative example 2-1 | Example 2-1 | Example 2-2 |
|---|---|---|---|
| PTFE particles Amount added (% by volume) | 0 | 10 | 20 |
| Polishing process | Yes | Yes | Yes |
| Static contact angle (°) | 9 | 102.4 | 106.4 |

TABLE 2

|  | Comparative example 2-2 | Example 2-3 | Example 2-4 |
|---|---|---|---|
| PTFE particles Amount added (% by volume) | 0 | 10 | 20 |
| Polishing process | No | No | No |
| Static contact angle (°) | 44 | 49.4 | 67.3 98.2 |

(Evaluation of Test Samples)

<Contact Angle Measurement>

The static contact angle to ion-exchanged water in the test samples of examples 2-1 to 2-4 and comparative examples 2-1 to 2-2 was measured using the same automatic contact angle meter as in example 1. Specifically, for the test samples of example 2-1, example 2-2, and comparative example 2-1, the static contact angle was measured at three positions on each of the polished surfaces, and each average value was set as the static contact angle of each test sample. For the test samples of example 2-3, example 2-4, and comparative example 2-2, the static contact angle was measured at three positions on each of the flat surfaces, and each average value was set as the static contact angle of each test sample. Note that for example 2-4, the static contact angle was measured for two test samples. Results of the static contact angle measurement for each of the test samples are shown in Tables 1 and 2.

As shown in Table 1, the test samples of example 2-1 and example 2-2 each have the static contact angle greater than 100°. Therefore, it is seen that each surface of the test samples exhibits high water repellency. In contrast, the test sample of comparative example 2-1 does not contain PTFE particles, and thus the static contact angle is less than 10°, indicating that the water repellency is low.

As shown in Table 2, the test samples of example 2-3 and example 2-4 each have the static contact angle larger than that of comparative example 2-2. Therefore, it is seen that test samples according to the present embodiment has improved water repellency without performing the polishing process.

Note that as shown in Table 2, the static contact angle was measured in example 2-4 for two test samples. As a result, the two test samples showed a difference of about 30° in static contact angle. The reason for such a result is not clear, but it is presumed that such a difference in static contact angle was caused by the influence of the amount and/or dispersion degree of the PTFE particles located on the surface of the test samples.

<Surface Analysis by Time-of-Flight Secondary Ion Mass Spectrometry>

The test samples of example 2-1, example 2-2, example 2-4, and comparative example 2-1 were subjected to surface analysis by time-of-flight secondary ion mass spectrometry (TOF-SIMS). TOF-SIMS is a method of irradiating a solid sample with an ion beam (primary ion) and separating ions emitted from the surface (secondary ion) by mass separation using time-of-flight difference. TOF-SIMS provides information on an element or a molecular species present at a depth of 1 nm or less from the sample surface.

Figure 11A:
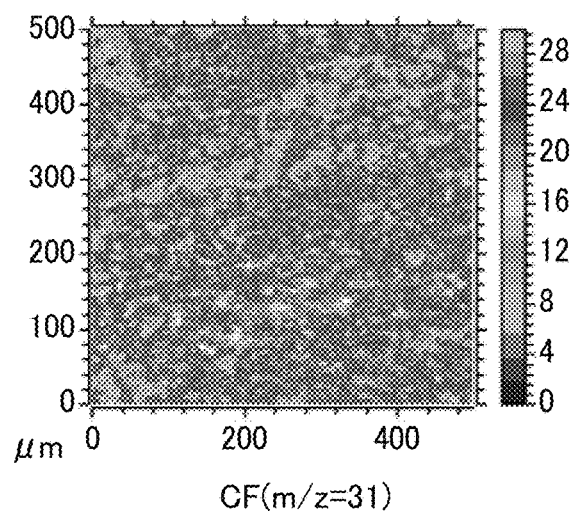
FIG. 11A illustrates results of surface analysis by time-of-flight secondary ion mass spectrometry in test samples according to example 2-1 and example 2-2.
Figure 11A:
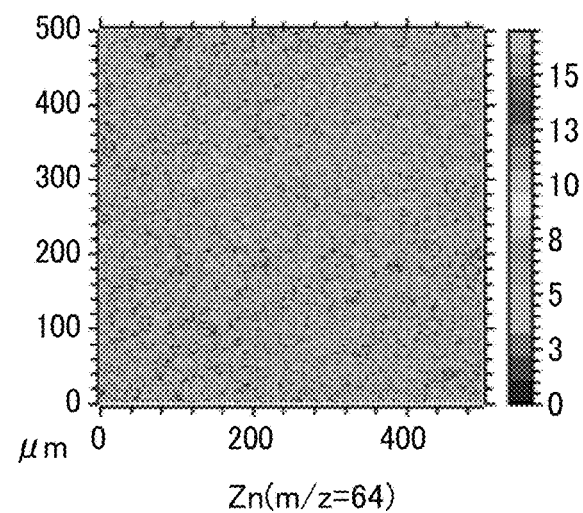
Figure 11A:
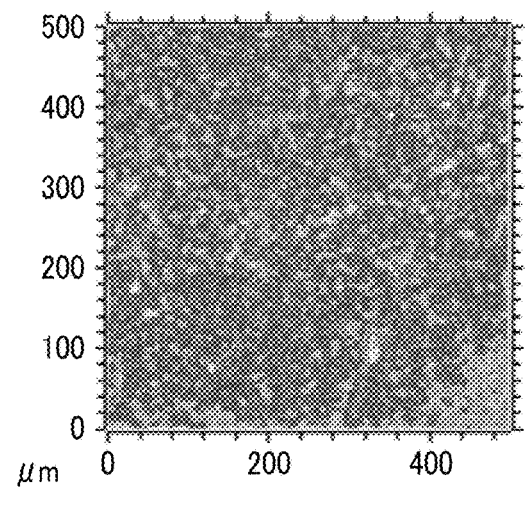
Figure 11A:
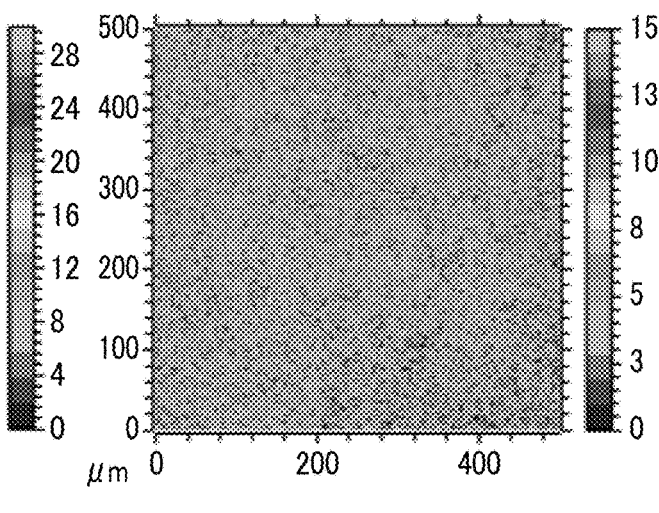
Figure 11B:
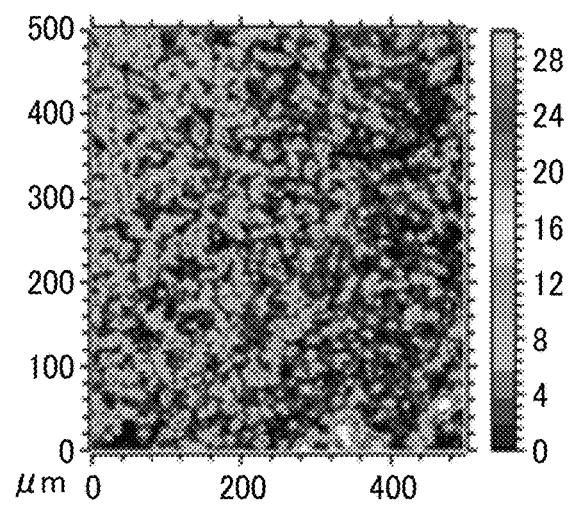
FIG. 11B illustrates results of surface analysis by time-of-flight secondary ion mass spectrometry in test samples according to example 2-4 and comparative example 2-1.
Figure 11B:
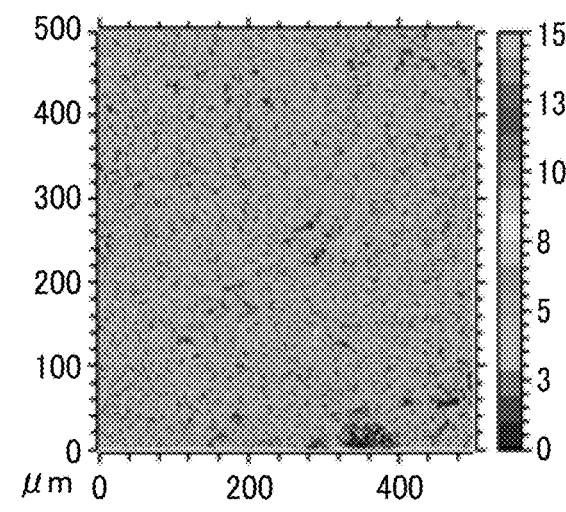
Figure 11B:
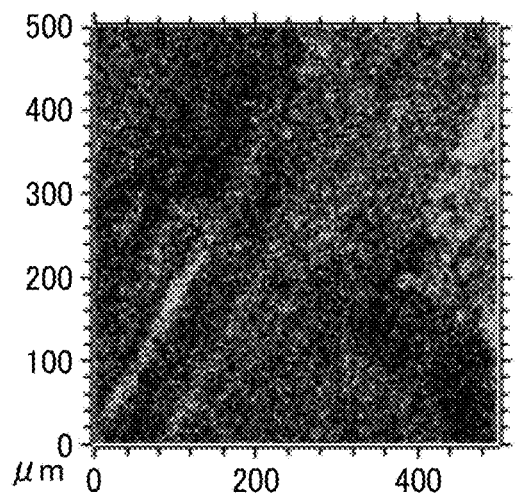
Figure 11B:
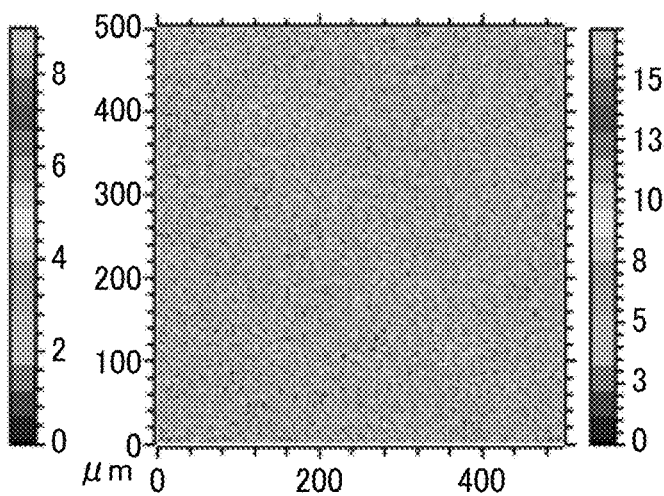

The measurement in TOF-SIMS was performed using a time-of-flight secondary ion mass spectrometer TOF.SIMS[5] manufactured by IONTOF under the following conditions. For the test samples of example 2-4, surface analysis was performed on one of the three test samples prepared, for which the static contact angle was not measured. FIG. 11A illustrates the results of surface analysis in the test samples of example 2-1 and example 2-2. FIG. 11B illustrates the results of surface analysis in the test samples of example 2-4 and comparative example 2-1.

Primary ion: $Bi^{3+}$
Primary ion acceleration voltage: 30 kV
Analysis area: 500 μm×500 μm
Secondary ion polarity: Negative
Irradiation depth: ~several nanometers
Observed elements: CF (m/z=31), Zn (m/z=64)

As illustrated in FIG. 11A, CF (carbon-fluorine) is detected on the entire surfaces of the test samples of example 2-1 and example 2-2. That is, in the test samples of example 2-1 and example 2-2, it is seen that CF is distributed to spread over the entire surfaces. In contrast, as illustrated in FIG. 11B, CF (carbon-fluorine) is detected to be scattered in the test sample of example 2-4. That is, in the test sample of example 2-4, it is seen that CF is not spread over the entire surface but is localized. Note that CF was hardly detected in the test sample of comparative example 2-1.

The surface analysis by TOF-SIMS shows that in the test samples of example 2-1 and example 2-2, the PTFE particles are spread in the polishing process, and a PTFE thin film is formed on the surface of the test samples. In contrast, in the test sample of example 2-4 without the polishing process, it is seen that the PTFE particles are scattered on the surface without spreading. From the results of the contact angle measurement and surface analysis described above, it is seen that the water repellency of the entire test sample is increased by spreading the PTFE particles and forming the thin film of PTFE on the surface of the test sample.

REFERENCE EXAMPLE (Preparation of Test Sample)

Figure 12:
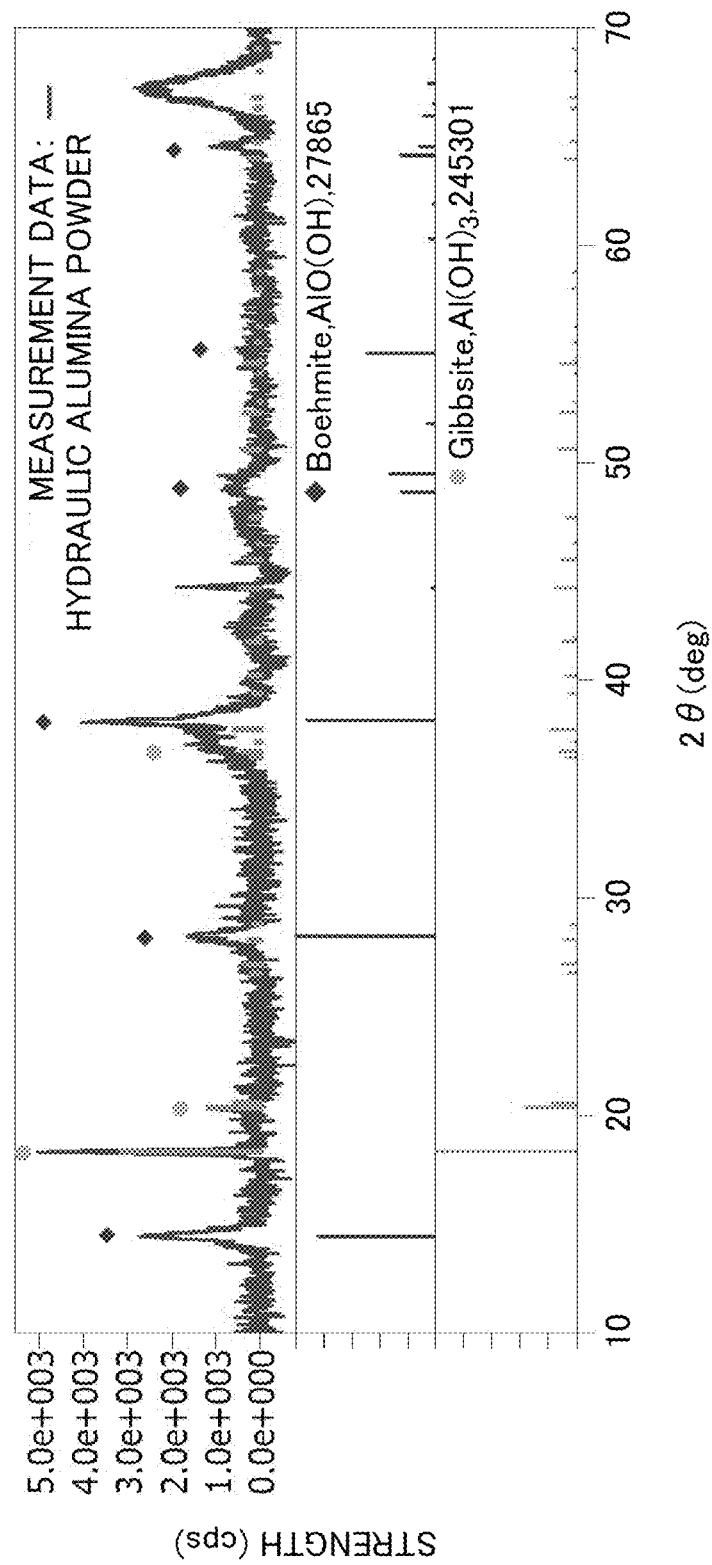
FIG. 12 is a graph illustrating an X-ray diffraction pattern of hydraulic alumina used in a reference example and patterns of boehmite (AlOOH) and gibbsite ($Al(OH)_3$) registered in the ICSD.

Hydraulic alumina BK-112 manufactured by SUMITOMO CHEMICAL COMPANY, LIMITED was prepared as the inorganic particles. Note that this hydraulic alumina has the central particle size of 16 μm. FIG. 12 illustrates the X-ray diffraction pattern of powder of the above-described hydraulic alumina and patterns of boehmite (AlOOH) and gibbsite ($Al(OH)_3$) registered in the ICSD. As illustrated in FIG. 12, it is seen that the hydraulic alumina is a mixture of boehmite and gibbsite. Although not illustrated in FIG. 12, the hydraulic alumina also includes p alumina.

Next, ion exchange water was weighed to be 80% by mass to the hydraulic alumina, and then the hydraulic alumina and the ion exchange water were mixed by using a mortar and pestle made of agate to obtain a mixture. Next, the mixture obtained was put into a cylindrical molding die (φ10) having an internal space. The test sample of the present example was obtained by heating and pressurizing the mixture under the condition of 50 MPa, 120° C., and 20 minutes. The test sample of this example had a high hardness like a sintered body.

(Evaluation of Test Sample)

<X-Ray Diffraction Measurement>

Figure 13:
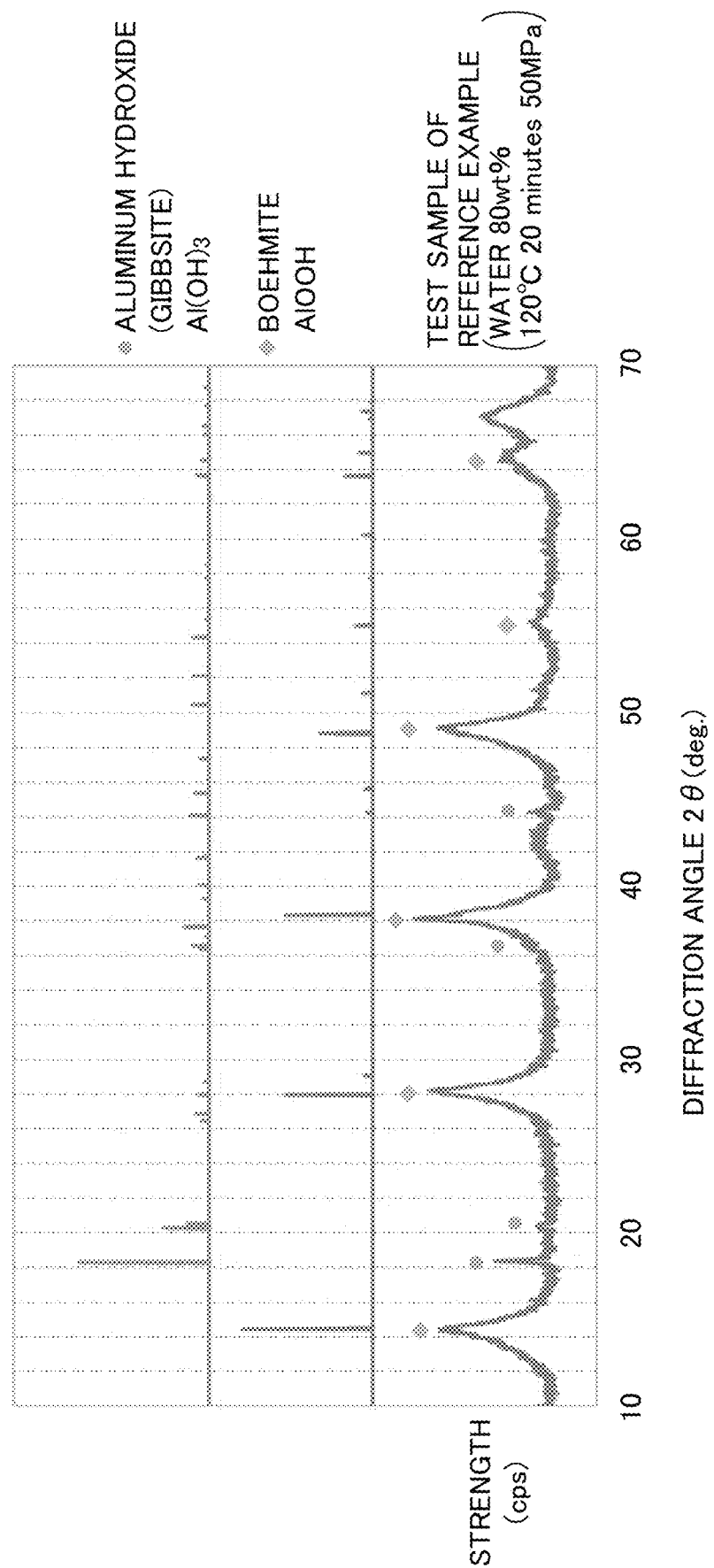
FIG. 13 is a graph illustrating an X-ray diffraction pattern of a test sample of the reference example and X-ray diffraction patterns of boehmite and gibbsite registered in the ICSD.

The X-ray diffraction pattern of the test sample of the reference example was measured using an X-ray diffraction apparatus. FIG. 13 illustrates the X-ray diffraction pattern of the test sample of reference example and X-ray diffraction patterns of boehmite and gibbsite registered in the ICSD. It is seen from FIG. 13 that the test sample of reference example is a structure mainly made from boehmite. Therefore, as illustrated in FIGS. 12 and 13, it is seen that gibbsite (aluminum hydroxide), which is the raw material, changes to boehmite by a low-temperature sintering method.

Thus, it is seen that the matrix part 10 made from boehmite is obtained by the low-temperature sintering method. Therefore, by dispersing the water-repellent resin 20 in the matrix part 10, the water-repellent member 100 that is lightweight and excellent in chemical stability is obtained.

Although the contents of the present embodiment have been described above with reference to the examples, it is obvious to those skilled in the art that the present embodiment is not limited to these descriptions and that various modifications and improvements are possible.

The entire contents of Japanese Patent Application No. 2019-59184 (filed on: Mar. 26, 2019) and Japanese Patent Application No. 2019-152540 (filed on: Aug. 23, 2019) are incorporated herein by reference.

INDUSTRIAL APPLICABILITY

According to the present disclosure, there is provided a water-repellent member that is stable for a long time when a water-repellent resin is used, and a building member and a wet room member each using the water-repellent member.

REFERENCE SIGNS LIST

10 Matrix part
10a Surface of matrix part
10b Gap
11 Particles of inorganic substance
20 Water-repellent resin
100 Water-repellent member

The invention claimed is:

1. A water-repellent member, comprising:
a matrix part that comprises a plurality of particles of an inorganic substance including at least one of a metal oxide or a metal hydroxide and is formed by the particles of the inorganic substance bonding each other, the matrix part having a thickness of 50 μm or more; and
a water-repellent resin present in a dispersed state inside the matrix part,
wherein the water-repellent member has a porosity of 20% or less in a section of the matrix part, and
the water-repellent resin is not continuously present from a surface of the matrix part to an inside of the matrix part.

2. The water-repellent member according to claim 1, wherein the water-repellent resin is not present in a film shape on the surface of the matrix part.

3. The water-repellent member according to claim 1, wherein the matrix part has a volume ratio larger than that of the water-repellent resin.

4. The water-repellent member according to claim 1, wherein the matrix part is hydrophilic.

5. The water-repellent member according to claim 1, wherein a static contact angle with water is 90° or more.

6. The water-repellent member according to claim 1, wherein the matrix part has no gap communicating from the surface of the matrix part to the inside of the matrix part.

7. The water-repellent member according to claim 1, wherein the water-repellent member has the porosity of 10% or less in the section of the matrix part.

8. The water-repellent member according to claim 1, wherein the inorganic substance is a polycrystalline substance.

9. The water-repellent member according to claim 1, wherein the water-repellent resin is present at grain boundaries of particles of the inorganic substance.

10. A building member, comprising:
the water-repellent member according to claim 1.

11. A wet room member, comprising:
the water-repellent member according to claim 1.

* * * * *